(12) United States Patent
Millon

(10) Patent No.: US 10,211,436 B2
(45) Date of Patent: Feb. 19, 2019

(54) MULTIPLE PIECE BATTERY CELL ISOLATOR

(75) Inventor: Christopher M. Millon, Grand Blanc, MI (US)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 1202 days.

(21) Appl. No.: 13/609,474

(22) Filed: Sep. 11, 2012

(65) Prior Publication Data

US 2013/0302664 A1 Nov. 14, 2013

Related U.S. Application Data

(60) Provisional application No. 61/644,097, filed on May 8, 2012.

(51) Int. Cl.
*H01M 2/10* (2006.01)
*H01M 10/0525* (2010.01)

(52) U.S. Cl.
CPC ....... *H01M 2/1061* (2013.01); *H01M 2/1072* (2013.01); *H01M 2/1094* (2013.01); *H01M 10/0525* (2013.01); *H01M 2220/20* (2013.01); *Y02E 60/122* (2013.01)

(58) Field of Classification Search
CPC ............. H01M 2/0202; H01M 2/0404; H01M 2/0473; H01M 2/0482; H01M 2/0277; H01M 2/0267; H01M 2/0217
See application file for complete search history.

(56) References Cited

U.S. PATENT DOCUMENTS

| 5,543,248 A | 8/1996 | Dougherty et al. |
| 5,704,803 A | 1/1998 | Oshima et al. |
| 8,703,319 B1 * | 4/2014 | Aston ............... H02J 7/0068 |
| | | 429/120 |

(Continued)

FOREIGN PATENT DOCUMENTS

CN 100344012 C 10/2007

OTHER PUBLICATIONS

International Search Report and Written Opinion corresponding to PCT Application No. PCT/US2013/040059, dated Jul. 24, 2013 (8 pages).

*Primary Examiner* — Barbara L Gilliam
*Assistant Examiner* — Nathanael T Zemui
(74) *Attorney, Agent, or Firm* — Maginot Moore & Beck LLP

(57) ABSTRACT

A lithium ion cell includes a housing and positive and negative terminals. The housing includes top and bottom surfaces. The housing includes first, second, third, and fourth side surfaces, perpendicular to the top and bottom surfaces. A cell isolator includes first and second portions made of an electrically non-conductive material. The first portion includes first, second, and third wall members. The first wall member directly contacts the first side surface. The second wall member directly contacts a portion of the second side surface. The third wall member directly contacts a portion of the third side surface. The second portion includes fourth, fifth, and sixth wall members. The fourth wall member directly contacts the fourth side surface. The fifth wall member directly contacts portions of the second side surface and the second wall member. The sixth wall directly contacts portions of the third side surface and the third wall member.

19 Claims, 3 Drawing Sheets

(56) References Cited

U.S. PATENT DOCUMENTS

| | | | |
|---|---|---|---|
| 2006/0257731 A1* | 11/2006 | Yoon .............................. | 429/176 |
| 2007/0037046 A1* | 2/2007 | Takahashi ............. | H01M 2/021 |
| | | | 429/96 |
| 2009/0208835 A1 | 8/2009 | Horiuchi et al. | |
| 2009/0302804 A1* | 12/2009 | Park .................... | H01M 2/0215 |
| | | | 320/128 |
| 2011/0076528 A1* | 3/2011 | Lim ................................ | 429/56 |
| 2011/0076543 A1* | 3/2011 | Ro ...................... | H01M 2/0413 |
| | | | 429/121 |
| 2013/0309546 A1* | 11/2013 | Park .............................. | 429/120 |

* cited by examiner

MULTIPLE PIECE BATTERY CELL ISOLATOR

CROSS-REFERENCE TO RELATED APPLICATIONS

This application claims the benefit of U.S. Provisional Application No. 61/644,097, filed on May 8, 2012. The disclosure of the above application is incorporated herein by reference in its entirety.

FIELD

The present disclosure relates to battery modules for vehicles and more particularly to isolators for prismatic cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid electric vehicles (HEVs), plug-in HEVs, and other types of electric vehicles (EVs) use multiple propulsion systems to provide motive power. The propulsion systems may include electric or battery powered systems that receive power from one or more battery modules. A battery module may include, for example, one or more banks of high-voltage cells (or batteries), such as lithium ion cells. The cells are volumetric building blocks of the battery module.

SUMMARY

A lithium ion cell includes a housing and positive and negative terminals. The housing includes top and bottom surfaces. The housing includes first, second, third, and fourth side surfaces, perpendicular to the top and bottom surfaces. A cell isolator includes first and second portions made of an electrically non-conductive material. The first portion includes first, second, and third wall members. The first wall member directly contacts the first side surface. The second wall member directly contacts a portion of the second side surface. The third wall member directly contacts a portion of the third side surface. The second portion includes fourth, fifth, and sixth wall members. The fourth wall member directly contacts the fourth side surface. The fifth wall member directly contacts portions of the second side surface and the second wall member. The sixth wall directly contacts portions of the third side surface and the third wall member.

In further features, the first and second portions are formed from Formex.

In other features, the first portion further includes a seventh wall member that directly contacts the bottom surface.

In still other features, the seventh wall member is perpendicular to the first, second, and third wall members.

In further features, the first portion further includes an eighth wall member that directly contacts a portion of the top surface.

In still further features, the eighth wall member is perpendicular to the first, second, and third wall members.

In other features, the second portion further includes a ninth wall member that directly contacts a second portion of the top surface.

In still other features, the ninth wall member further directly contacts a portion of the eighth wall member.

In further features, the second portion further includes a tenth wall member that directly contacts the seventh wall member.

In still further features, the tenth wall member is perpendicular to the fourth, fifth, and sixth wall members.

In other features, the ninth wall member is perpendicular to the fourth, fifth, and sixth wall members.

In still other features, the first portion is fixed to the lithium ion cell by an interference fit.

In further features, the second portion is fixed to the lithium ion cell and to the first portion by an interference fit.

In still further features, an adhesive fixes the first portion of the cell isolator to the lithium ion cell.

In other features, a second adhesive fixes the second portion of the cell isolator to the first portion of the cell isolator.

In still other features, the second portion of the cell isolator is welded to the first portion of the cell isolator.

In further features, thicknesses of the first and second portions are greater than one-half of a predetermined maximum particle dimension.

In still further features, the housing of the lithium ion cell is electrically connected to the positive terminal.

In other features, the housing of the lithium ion cell is electrically connected to the negative terminal.

In other features, the housing of the lithium ion cell is not electrically connected to the positive terminal or the negative terminal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

In the following description, a cell isolator for prismatic cells of a battery module is disclosed. The cell isolator is shown and described as an example, and one or more characteristics of the cell isolator may be modified. For example, the cell isolator may be modified to accommodate cells having a different size and/or shape. Other examples of how the cell isolator can be modified are discussed further below. One cell isolator is provided for each cell of a battery module. The cell isolators aid in electrically isolating cells from each other, from other system components, and from external contact, for example, during battery module assembly.

Figure 1:
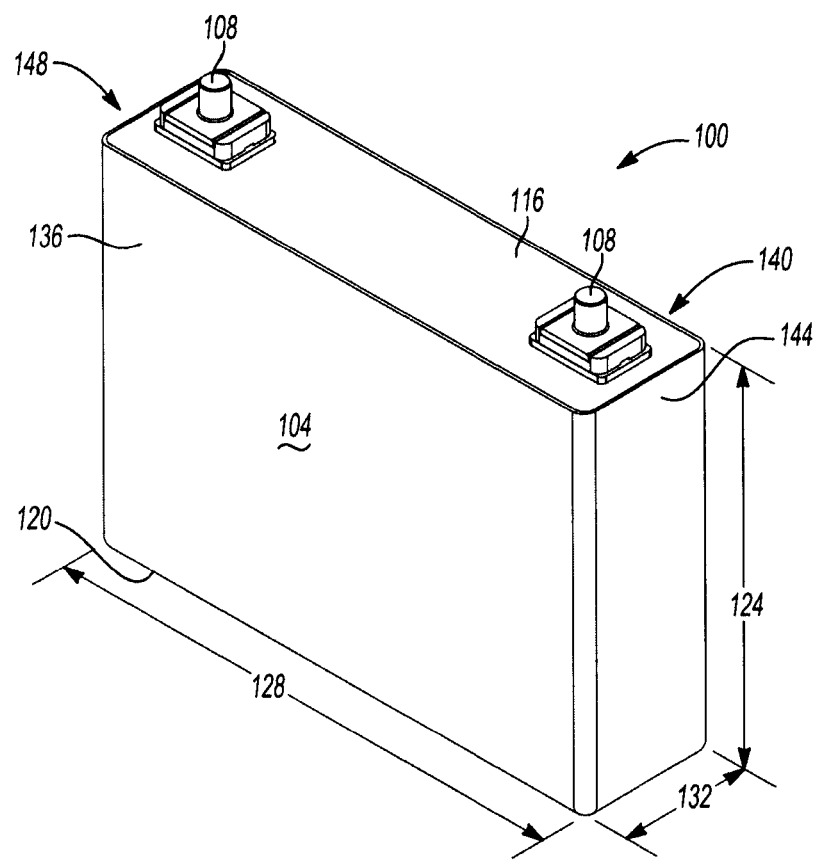
FIG. 1 is a perspective view of a prismatic cell.

In FIG. 1, a perspective view of a prismatic cell (hereafter "cell") 100 is shown. The cell 100 may include, for example, a rectangular shaped, lithium-ion cell with a housing (or can) 104. As an example, the housing 104 may be formed of aluminum or another (electrically) conductive material. While only a rectangular shaped cell is shown and discussed, the cell 100 may be another shape.

The cell 100 further includes a pair of terminals 108 that extend from the cell 100. The terminals 108 may include, for example, cylindrical terminals, threaded terminals, flat terminals, or another suitable type of terminal. The cell 100 may be charged and electrical energy may be drawn from the cell 100 via the terminals 108. A positive one of the terminals 108 may be connected to the (electrically conductive) housing 104. In this manner, a reference potential (voltage) of the housing 104 may be approximately equal to the reference potential at the positive one of the terminals 108. In various implementations, a negative one of the terminals 108 may be connected to the housing 104 or neither of the terminals 108 may be connected to the housing 104.

The housing 104 includes a top surface 116 and a bottom surface 120. The housing 104 has a height 124, a length 128, and a width 132. The housing 104 includes first and second surfaces 136 and 140 and includes third and fourth surfaces 144 and 148. Dimensions of the height 124, the length 128, the width 132, and the surfaces 136-148 are shown as examples only, and the dimensions of one or more of the height 124, the length 128, the width 132, and the surfaces 136-148 may be different.

The terminals 108 of the cell 100 and the terminals of one or more other cells can be connected in series, in parallel, or combinations thereof to form a battery module. One or more battery modules may be electrically connected in series, in parallel, or combinations thereof to form a battery pack, which may also be referred to as a cassette. One or more battery packs may be electrically connected in series, in parallel, or combinations thereof, and so on.

Figure 2:
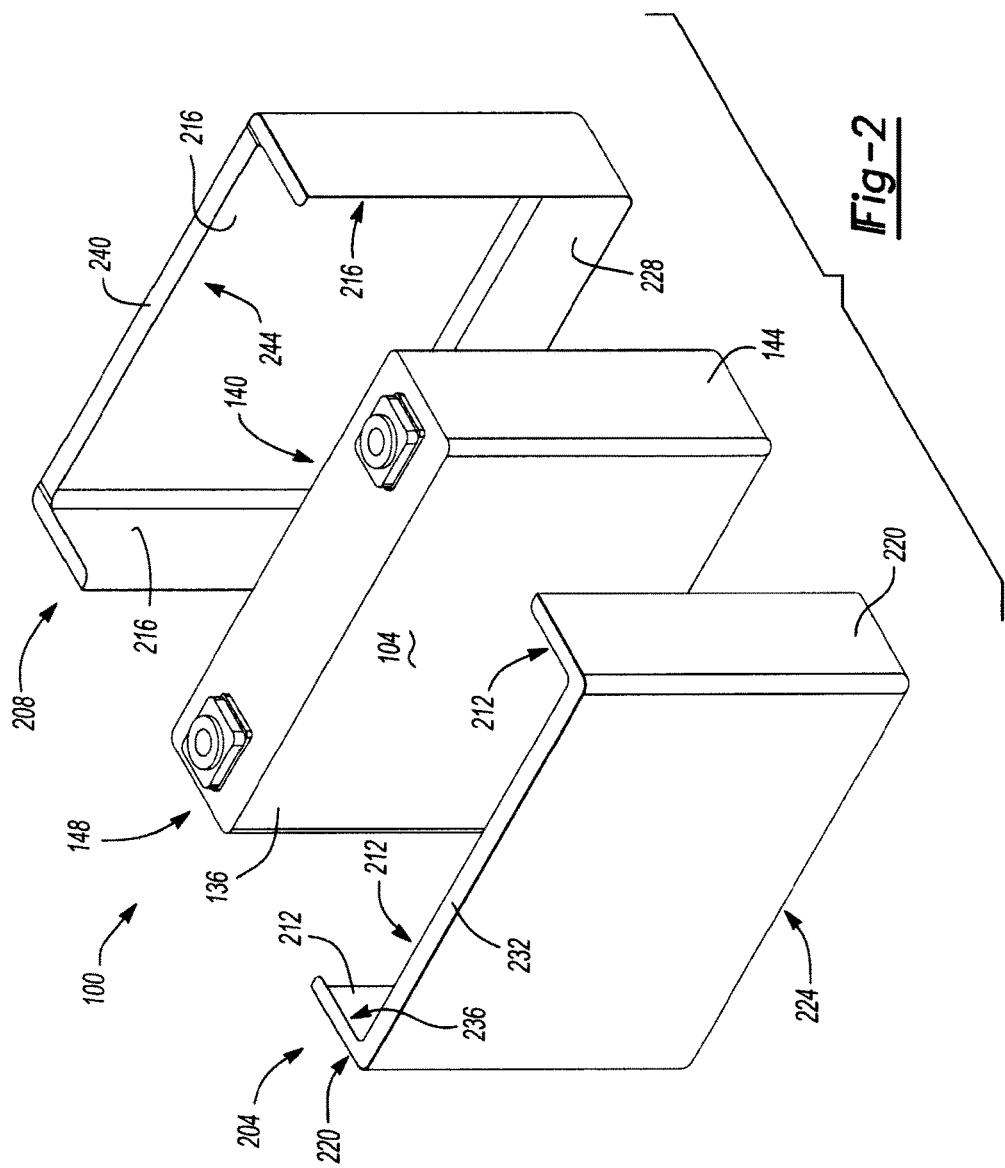
FIG. 2 is a perspective view of the prismatic cell with example portions of a cell isolator.
Figure 3A:
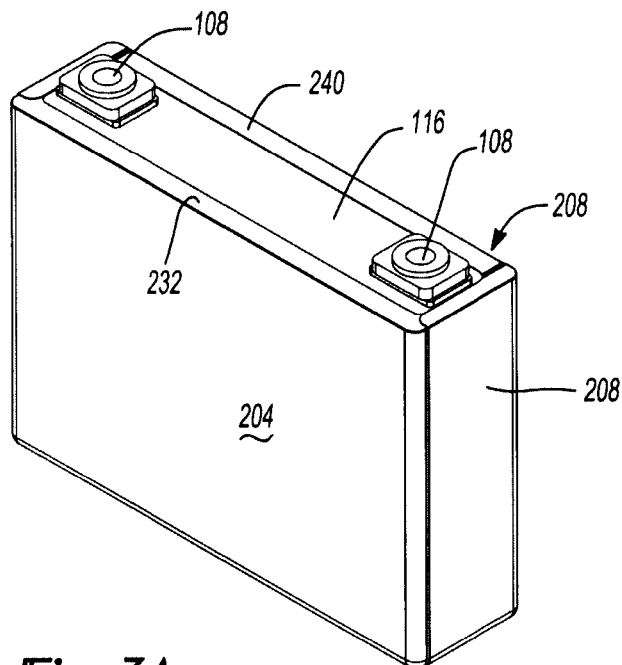
FIGS. 3A and 3B include front and back perspective views of the prismatic cell and the cell isolator.
Figure 3B:
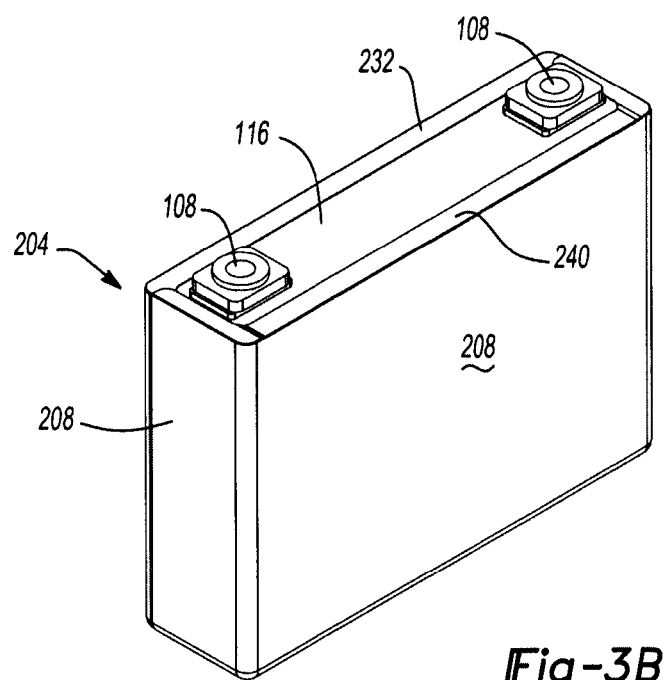

Because the housings of each cell may be electrically conductive and at approximately the same reference potential as their positive terminals, respectively, the housing of each cell is electrically insulated/isolated. FIG. 2 includes an example perspective view of the cell 100 with a first portion 204 of a cell isolator and a second portion 208 of the cell isolator. FIG. 3 includes front and back perspective views of the cell 100 within the cell isolator. While the cell isolator is shown and will be discussed as being a two-piece construction, the cell isolator may be constructed of two or more individual isolator portions.

Referring now to FIGS. 2 and 3, the first portion 204 of the cell isolator is formed to the shape of a first portion of the housing 104. The second portion 208 of the cell isolator is formed to a second portion of the housing 104 and a portion of the first portion 204. For example, as shown in FIG. 2, the first portion 204 of the cell isolator may be formed such that inner surfaces 212 of the first portion 204 will abut the first surface 136, the third surface 144, and the fourth surface 148 of the housing 104. The second portion 208 of the cell isolator may be formed such that inner surfaces 216 of the second portion 208 will abut the second surface 140 of the housing 104 and exterior surfaces 220 of the first portion 204 of the cell isolator.

The first and second portions 204 and 208 of the cell isolator are formed from an electrically non-conductive material. The first and second portions 204 and 208 of the cell isolator may be formed from polypropelene, Formex, Formex GK. For example only, the first and second portions 204 and 208 may be formed from Formex GK-5, Formex GK-10, Formex GK-17, for Formex GK with another suitable thickness. In various implementations, the first and second portions 204 and 208 may be formed of another suitable material that has at least a predetermined dielectric strength and that satisfies at least a predetermined flame classification (e.g., UL 94V-0), such as another type of polypropelene (PPE). The first and second portions 204 and 208 may be formed to their respective shapes, for example, via thermoforming (e.g., pressure or vacuum), injection molding, blow molding, or rotational molding.

A thickness of each of the first and second portions 204 and 208 satisfies the relationship:

$$T \geq \frac{MaxParticleSize}{2},$$

where T is the thickness (e.g., in millimeters or fractions of an inch) of each of the first and second portions 204 and 208 and MaxParticleSize is a maximum dimension (e.g., in millimeters or fractions of an inch) of particles that may be present between two portions of two adjacent cell isolators in, for example, a battery module.

The thickness being greater than or equal to one half of the maximum dimension may account for the presence of two portions of two cell isolators being disposed between two adjacent cells. Thus, if a particle having the maximum dimension penetrates the two portions of two cell isolators disposed between the two adjacent cells, at least one of the two portions will still electrically isolate the housings of the two adjacent cells. The thickness being greater than one half of the maximum dimension may account for any compression of cell isolators when used in a battery module. Thickness of the first and second portions 204 and 208 may be selected to satisfy the above relationship, given the maximum dimension for a particular application.

Multiple portion cell isolators may be manufactured more easily and therefore be less expensive than, for example, single piece cell isolators and modular frames with multiple, electrically isolated compartments for cells. Additionally, multiple portion cell isolators may be less expensive than other types of cell isolators, such as electrically insulative epoxies that can be sprayed onto the housing of each cell.

The first portion 204 and/or the second portion 208 may be formed with a bottom member. For example, the first portion 204 of the cell isolator may be formed with a bottom member 224 that will abut the bottom surface 120 of the cell 100. The second portion 208 of the cell isolator may be formed with a bottom member 228 that will abut a bottom surface of the bottom member 224. In various implementations, only one of the first and second portions 204 and 208 may be formed with a bottom member. In various implementations, neither of the first and second portions 204 and 208 may be formed with a bottom member. Neither of the first and second portions 204 and 208 of the cell isolator may be formed with a bottom member, for example, for implementation of a cooling assembly that draws heat away from the cell 100 via contact with the bottom surface 120 of the cell 100.

The first portion 204 and the second portion 208 may be formed with lip members. For example, the first portion 204 of the cell isolator may be formed with a lip member 232. An inner surface 236 of the lip member 232 may abut a first portion of the top surface 116 of the cell 100. The second portion 208 of the cell isolator may be formed with a lip member 240. An inner surface 244 of the lip member 240 may abut a second portion of the top surface 116 of the cell 100 and a portion of an outer surface of the lip member 232.

The first portion 204 of the cell isolator may be fixed to the cell 100. For example only, the first portion 204 may be fixed to the cell 100 via an adhesive. In various implementations, the first portion 204 may be fixed to the cell 100 via an interference fit (e.g., a press fit or a friction fit). In the case of an interference fit, an adhesive may or may not be used.

The second portion 208 of the cell isolator may be fixed to the first portion 204 of the cell isolator. The second portion 208 of the cell isolator may be fixed to the first portion 204 of the cell isolator after the first portion 204 of the cell isolator has been fixed to the cell 100. The second portion 208 of the cell isolator may be fixed to the first portion 204 of the cell isolator at locations where the first and second portions 204 and 208 overlap. The second portion 208 may be fixed to the first portion 204, for example, by welding the first and second portions 204 and 208 (e.g., by laser welding, ultrasonic welding, hot plate welding, etc.), via an adhesive, or in another suitable manner. The second portion 208 may also be fixed to the cell 100, for example, via an adhesive.

In various implementations, the first and second portions 204 and 208 may be fixed together prior to introduction of the cell 100, and the lip members 232 and 240 may be omitted. The first and second portions 204 and 208 of the cell isolator may be fixed together prior to introduction of the cell 100, for example, by welding the first and second portions 204 and 208 (e.g., by laser welding, ultrasonic welding, hot plate welding, etc.), via an adhesive, or in another suitable manner. The cell 100 may be inserted into the cell isolator via an interference fit (e.g., a press fit or a friction fit) between the cell isolator formed by the first and second portions 204 and 208 and the cell 100.

The cell 100 and the cell isolator can be combined with one or more other cells and one or more other cell isolators in a battery module. The cell isolators electrically isolate the housings of the cells from each other.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

What is claimed is:

1. A battery assembly comprising:
    a first lithium ion cell that includes a positive terminal, that includes a negative terminal, and that includes an electrically conductive can housing that encloses the first lithium ion cell and that:
        includes a top surface and a bottom surface; and
        includes first, second, third, and fourth side surfaces that are perpendicular to the top and bottom surfaces;
    a cell isolator that includes a first portion and a second portion,
    wherein the first portion:
        is made of an electrically non-conductive material;
        includes a first wall member that directly contacts the first side surface;
        includes a second wall member that is perpendicular to the first wall member and that directly contacts a first area of the second side surface; and
        includes a third wall member that is perpendicular to the first wall member and that directly contacts a first area of the third side surface;
    wherein the second portion:
        is made of the electrically non-conductive material;
        includes a fourth wall member that directly contacts the fourth side surface;
        includes a fifth wall member that is perpendicular to the fourth wall member, that directly contacts the a second area of the second side surface, and that directly contacts a portion of the second wall member; and
        includes a sixth wall member that is perpendicular to the fourth wall member, that directly contacts a second area of the third side surface, and that directly contacts a portion of the third wall member, and
    wherein the first lithium ion cell is enclosed within the housing,
    wherein an inner surface of the first portion of the cell isolator is fixed directly to an outer surface of the housing of the first lithium ion cell, and
    wherein the first lithium ion cell is a prismatic lithium ion cell of a battery module for a vehicle.

2. The battery assembly of claim 1 wherein the first and second portions are formed from polypropylene.

3. The battery assembly of claim 1 wherein the housing of the lithium ion cell is not electrically connected to the positive terminal or the negative terminal.

4. The battery assembly of claim 1 wherein the first portion further includes a seventh wall member that directly contacts the bottom surface.

5. The battery assembly of claim 4 wherein the seventh wall member is perpendicular to the first, second, and third wall members.

6. The battery assembly of claim 4 wherein the first portion further includes an eighth wall member that directly contacts a portion of the top surface.

7. The battery assembly of claim 6 wherein the eighth wall member is perpendicular to the first, second, and third wall members.

8. The battery assembly of claim 6 wherein the second portion further includes a ninth wall member that directly contacts a second portion of the top surface.

9. The battery assembly of claim 8 wherein the ninth wall member further directly contacts a portion of the eighth wall member.

10. The battery assembly of claim 9 wherein the second portion further includes a tenth wall member that directly contacts the seventh wall member.

11. The battery assembly of claim 10 wherein the tenth wall member is perpendicular to the fourth, fifth, and sixth wall members.

12. The battery assembly of claim 11 wherein the ninth wall member is perpendicular to the fourth, fifth, and sixth wall members.

13. The battery assembly of claim 1 wherein the first portion is fixed to the lithium ion cell by an interference fit with the housing of the lithium ion cell.

14. The battery assembly of claim 13 wherein the second portion is fixed to the lithium ion cell and to the first portion by an interference fit.

15. The battery assembly of claim 1 further comprising an adhesive that fixes the first portion of the cell isolator to the lithium ion cell.

16. The battery assembly of claim 15 further comprising a second adhesive that fixes the second portion of the cell isolator to the first portion of the cell isolator.

17. The battery assembly of claim 1 wherein the second portion of the cell isolator is welded to the first portion of the cell isolator.

18. The battery assembly of claim 1 wherein the housing of the lithium ion cell is electrically connected to the positive terminal.

19. The battery assembly of claim 1 wherein the housing of the lithium ion cell is electrically connected to the negative terminal.

* * * * *